Dec. 2, 1969  F. HOCK  3,482,107
PHOTOELECTRIC POSITION SENSING DEVICE COMPRISING LIGHT
DIFFRACTING PHASE GRATINGS USING POLARIZER BEAM
SPLITTERS FOR SENSING THE TIME PHASE
POSITION OF THE GRATINGS
Filed July 21, 1967  2 Sheets-Sheet 1

INVENTOR
FROMUND HOCK
BY
ATTORNEY

Dec. 2, 1969

F. HOCK 3,482,107

PHOTOELECTRIC POSITION SENSING DEVICE COMPRISING LIGHT
DIFFRACTING PHASE GRATINGS USING POLARIZER BEAM
SPLITTERS FOR SENSING THE TIME PHASE
POSITION OF THE GRATINGS

Filed July 21, 1967

INVENTOR
FROMUND HOCK

BY
ATTORNEY

United States Patent Office 3,482,107
Patented Dec. 2, 1969

3,482,107
PHOTOELECTRIC POSITION SENSING DEVICE COMPRISING LIGHT DIFFRACTING PHASE GRATINGS USING POLARIZER BEAM SPLITTERS FOR SENSING THE TIME PHASE POSITION OF THE GRATINGS
Fromund Hock, Wetzlar, Germany, assignor to
Ernst Leitz GmbH
Filed July 21, 1967, Ser. No. 655,162
Claims priority, application Germany, July 26, 1966,
L 54,168
Int. Cl. G01b 9/02
U.S. Cl. 250—237
25 Claims

ABSTRACT OF THE DISCLOSURE

Optical sensing means for position or motion determining apparatus having a light source which passes a beam of light through a diffraction grating and thence either back onto the same grating by reflection or through a second grating. Photoelectric transducers sense two different diffraction orders which vary in time phase opposition as one of the gratings is moved.

BACKGROUND OF THE INVENTION

The present invention relates to devices for photoelectrically determining the position or movement of precision machine tool carriages and the like, and more particularly to photoelectric devices for sensing the position or movement of diffraction gratings of the type in which an image of a portion of a diffraction grating is projected upon itself or upon another part of the same grating, and in which signals are obtained photoelectrically in response to movement of the grating image with respect to the grating itself, which signals are a measure of the displacement of the grating.

An arrangement of this type for sensing the relative position of a transmission grating of the amplitude type was described in the Journal of Scientific Instruments, August 1960, at page 261. In this arrangement a parallel beam of light rays is produced by means of a lamp and an associated optical system. This light beam is diffracted by the grating whose position is to be determined and then produces direct and diffracted pinhole images on a concave mirror. The reflected beams, as directed by the mirror and other optical means, produce a grating image at the plane of the grating. The relative position of the grating image and the grating determines the amount of light that passes through the grating, and an evaluation is then made by means of a photosensitive device disposed in the light which passes through the grating.

In Swiss Patent No. 401,500 there is shown a device for the measurement of displacements wherein a reflection grating is employed which is projected upon itself. By optical means, signals can be produced which are shifted in phase with respect to one another and can serve for indicating the direction of motion of the grating.

In previously known devices of the class described herein in which only one optical channel is used, the optical signal provided by the main optical elements of the channel is a single phase signal. This single phase signal may be modified by the use of auxiliary birefringent, polarizing, or color selective optical devices, as shown and described, for example, in German Patent 1,136,834 and patent application L 35,751 IXa/42b, dividing it into phase-staggered output signals which may then be separated by further auxiliary optical means. As is well-known to those having ordinary skill in the art, however, the addition of such auxiliary optical devices does not provide the advantages of multi-phase signals emerging from the main optical elements of a single channel, as provided by the present invention.

SUMMARY OF THE INVENTION

The present invention is concerned with the problem of providing a photoelectric digital control device employing either reflection or transmission gratings which has but one main optical channel and yet provides multi-phase optical signals in the sense in which that term is explained above when the measuring device in which this invention is used is adapted to measure in one coordinate direction only, and provides a pair of such multi-phase signals when the measuring device embodying the invention is arranged for measurement in two coordinate directions. As will be understood by those having ordinary skill in the art, the multi-phase signals so produced may themselves be modified by the use of auxiliary optical devices in the manner described hereinabove, thereby splitting each component signal of the multi-signal into two phase-staggered components. Those having ordinary skill in the art, as taught by the present disclosure, will recognize the great practical advantage to be derived from the resulting availability of four-phase signal fields. For instance, these four-phase signal fields, when individually converted to electrical form by suitable photoelectric transducers, may be employed to directly operate indicators and servo means whose operating principle is analogous to that of the well-known Tesla induction motor. It will also be clear to those having ordinary skill in the art, as taught by the present disclosure, that certain embodiments of the present invention may employ transmission gratings of either the phase or amplitude type, or reflection gratings of either the phase or amplitude type, or combinations thereof.

In certain embodiments of the present invention an image of a phase grating whose effective phase difference is $\lambda/2$ is projected either onto a second phase grating or onto itself. The light beams producing the image of the grating impinge on photoelectric transducers after diffraction at the second grating, or after the second diffraction at the same grating, in such a manner that those diffraction orders whose intensities are modulated in phase opposition impinge upon different photoelectric transducers. According to a further feature of the present invention, the single grating, or first grating, in the arrangement just described can be an amplitude grating, rather than a phase grating. It is also possible within the scope of the present invention to dispose in the beam which produces the grating image optical components which produce separately detectable images, such as polarizers or color filters.

In accordance with a further feature of the present invention, the gratings employed in some embodiments of the invention can be cross gratings. In cross gratings for use in the present invention the crossing angle, i.e., the angle between the directions of the rulings, wire lays, or the like, will be equal to the desired angle between the coordinate directions. In multi-coordinate measuring means according to the present invention employing cross gratings, the illumination source is provided with two main illuminating units, one corresponding to each coordinate direction.

As will be recognized by those having ordinary skill in the art, the term "amplitude grating" as used herein denotes that type of diffraction grating comprising a set of elongated, very narrow and very closely spaced optical elements, all of which transmit or reflect light of the same phase when the grating is illuminated with coherent, parallel light.

The term "phase grating" as used herein denotes the type of diffraction grating having at least two different, parallel sets of narrow, elongated, closely-spaced optical elements, the elements of one set transmitting or reflecting light of a different phase from the light transmitted or reflected by the elements of the other set when the grating is illuminated with coherent, parallel light.

Certain embodiments of the present invention may employ amplitude cross gratings, i.e., grating means comprising at least a first set of single-phase optical elements such as those employed in a mono-axial amplitude grating and a second set of single-phase optical elements disposed at an angle to the first set.

Certain other embodiments of the present invention may employ phase cross gratings, i.e., grating means comprising at least a first pair of sub-sets of parallel optical elements having different phase properties such as are found in mono-axial phase gratings and a second pair of sub-sets of optical elements having different phase properties disposed at an angle to said first pair of sub-sets of optical elements.

Yet other embodiments of the present invention may employ hybrid, or amplitude-phase, cross gratings, i.e., grating means comprising at least a set of single-phase optical elements such as those employed in a mono-axial amplitude grating and a pair of sub-sets of optical elements having different phase properties such as used in a mono-axial phase grating disposed at an angle to the single-phase optical elements.

In certain embodiments of the present invention the optical system may advantageously comprise a concave mirror, or concave mirror segment cooperating with optically diffracting means.

It is an object of the present invention to provide a device of the class described herein having but one main optical channel and yet producing multi-phase optical output signals.

Another object of the present invention is to provide such a device wherein where there can be readily derived a four-phase signal field.

Yet another object of the present invention is the provision of such a device wherein there can be readily derived a four-phase signal field for each of two co-ordinate directions.

Other objects of the invention will in part be obvious, and will in part appear hereinafter.

The present invention, accordingly, comprises the features of construction, combinations of elements, and arrangements of parts, which will be exemplified in the constructions hereinafter set forth, and the scope of the present invention will be indicated in the claims.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
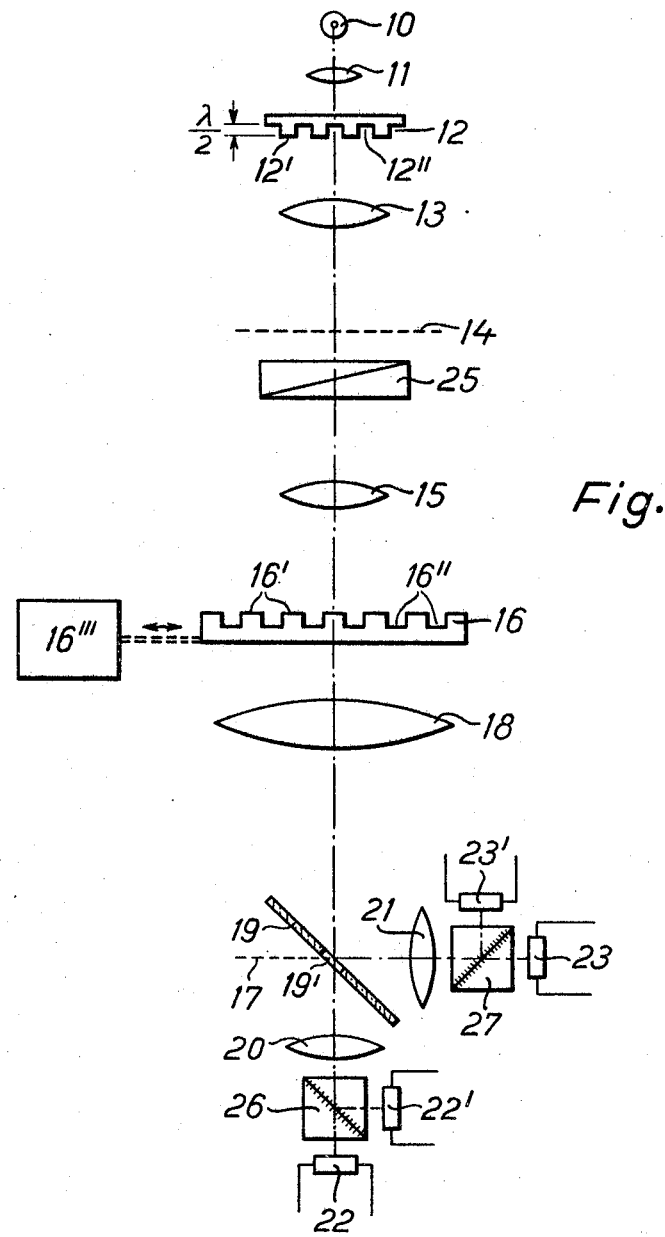
FIGURE 1 is a schematic representation of an embodiment of the present invention wherein two gratings are employed.

In the device illustrated in FIGURE 1, the beam of light rays emitted by a lamp 10 passes through a suitable condenser lens 11 and is thereafter diffracted by a phase grating 12. As will be evident to those having ordinary skill in the art, the schematic symbol employed in FIGURE 1 to represent phase grating 12 denotes a transmission-type phase grating. Such a transmission-type phase grating might, for instance, be a planar transparent element including narrow, elongated thick portions 12' interspersed with narrow, elongated thin portions 12". The difference in thickness between said thick portions and said thin portions may be such that the light emerging from the lower faces of said thick portions differs in phase by one half wavelength from the light emerging from the lower faces of said thin portions, for a particular principal light wavelength. As will be evident to those having ordinary skill in the art, this arrangement would result, where a highly monochromatic light source was employed, in the complete suppression of the zero and even order characteristics of the diffraction pattern produced by the grating. Even when a polychromatic, or white, source is used, and when the width of the spectral range is limited to less than a half of an octave, said suppression is sufficient for practical purposes.

The diffracted light beams emerging from the lower face of phase grating 12 are imaged by an objective 13. The light pattern resulting from the passage of light from lamp 10 through phase grating 12 is brought to a focus by objective 13 in its focal plane 14. As explained above, the zero order image will be missing from this light pattern because of the construction of half-wave phase grating 12.

The light patterns corresponding to the unsuppressed diffraction orders as imaged in focal plane 14 are further imaged by means of an objective 15 onto a second phase grating 16, and diffracted thereat. The light patterns produced by the action of first phase grating 12 as described hereinabove are parallel to the rulings of second phase grating 16 because of the alignment of phase gratings 12 and 16. In addition, the interspacing of the diffraction orders represented in the image produced at grating 16 corresponds to the grating constant of grating 16.

A field lens 18 images the diffraction order pattern produced by the light from phase grating 12 passing through phase grating 16 at a plane 17. The diffraction order pattern imaged at plane 17 includes a pattern, or image, of zero order, as well as patterns, or images, of higher order.

A planar beam splitter 19 intersects plane 17 at an angle, and is provided with a central aperture 19'. That portion of the light pattern imaged at plane 17 which corresponds to the zero order of diffraction produced at phase grating 16 passes through aperture 19' and is imaged by field lens 20 upon a suitable photoelectric transducer 22.

A portion of the light pattern produced at plane 17 corresponding to a higher order of diffraction is reflected by beam splitter 19 and imaged by a field lens 21 on a suitable photoelectric transducer 23.

It is a characteristic feature of the present invention that the electrical signals produced by photoelectric transducers 22 and 23 are in time phase opposition when grating 16 is moved in its own plane transversely to its optical elements and those of phase grating 12 by, for instance, a suitable precision lead screw, precision nut, gear train, and servo motor, all designated by the reference numeral 16''', and as shown merely schematically. In the practical arrangements, as will be evident to those having ordinary skill in the art as informed by the present disclosure, grating 16 will be mounted upon the carriage of a precision machine tool, scientific instrument, or the like, and means 16''' will be employed to move this carriage. This arrangement is, of course, merely exemplary, and not limiting. It will be clear, however, that in this arrangement the rapid fluctuation of illumination failing upon photoelectric transducers 22 and 23 with even small motions of this carriage will give a very sensitive and precise indication of the positioning of the carriage. Further, the time phase opposition relationship of the two signals produced by these photoelectric transducers will make it possible to get a common mode rejection in the following push-pull-amplifier (not shown). This 90° phase shift will make it possible to directly indicate the direction of movement of the carriage by means of a bi-directional counter and indicating equipment well-known in the art.

By the addition of a Wollaston prism 25 and polarizing beam splitters 26, 27, as shown in FIGURE 1, and with the addition of auxiliary photoelectric transducers 22' and 23', electrical signals may be obtained which are phase shifted with respect to the output signals of photoelectric transducers 22 and 23. By selecting suitable parameters for these auxiliary components, and particularly by so selecting Wollaston prism 25 for proper maximum spacing between the two images it produces, it is even possible to produce four electrical signals from transducers 22, 23, 22', and 23' which are time phase displaced with respect to one another by 90°. The utility of such a phased set of four signals, for instance, for driving an induction motor-type or cathode-ray-type interpolator, will be apparent to those having ordinary skill in the art.

The availability of these four time phase related signals also affords the advantage of eliminating the adverse influence of variations of the average luminous flux output. Further means for utilizing such time phase related signals are shown and described in German patent application L 50,450 IXb/42d or German patent application L 52,699 IXb/42d.

Certain additional modifications to the device of FIGURE 1 will be within the scope of those having ordinary skill in the art, such as the substitution of chromatic separation for the Wollaston prism separation shown in FIGURE 1, or the employment of grating 12 as the movable grating, rather than grating 16.

Figure 2:
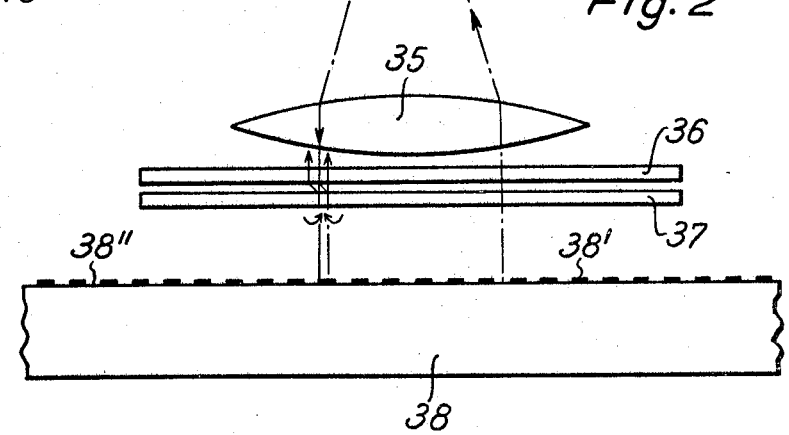
FIGURE 2 is a schematic representation of a second embodiment of the present invention wherein an image of the single grating employed is projected upon the grating itself.

In the embodiment of FIGURE 2 lamp 30 is so located that the principal rays of light passing from it and through condenser 31 form an acute angle with the principal axis of the optical system, with the direction of travel of the moving scale 38, and with the rulings of scale 38. The light leaving condenser 31 next passes through deviating prism 32, and then passes through a slot 61 defined by the adjacent edges of plane mirrors 60.

An internally reflective hemispherical segment 33 is located beside plane mirrors 60, and is pivotable about an axis 34. Pivoting of segment 33 about axis 34 may be carried out by means of an electromechanical transducer 48, the force of which is compensated by a spring (not shown) determinating the position of the segment 33. By this means it is possible to adjust the image position relative to the grating. Together it is possible to include the transducer in a self-aligning servo-loop.

A collimating lens 35 is disposed below slot 61 in such a position that its first principal focus coincides with the apex of the curvature of the optically effective surface of hemispherical segment 33.

After passing through slot 61, the incoming light beam passes through approximately one-half of the surface of lens 35, the portion of lens 35 through which the incoming light beam then passes being determined by the positioning of lamp 30 as described hereinabove. After passing through lens 35 the light beam further passes through an image-doubling birefringent plate 36, and thence through a quarter-wave plate 37 which is oriented at an angle of 45° with respect to the main planes of polarization of plate 36. After passing through plate 37 of the light impinges obliquely upon the scale 38 whose position or motion is to be determined. Upon leaving plate 37 the light takes the form of a parallel beam consisting of two mutually offset, right and left circularly polarized component beams. The principal axis of this inclined composite beam is located in a plane containing the direction of the grating ruling and the optical axis of the concave mirror lens system.

Grating scale 38 has an upper surface which consists of raised portions 38' and lower portions 38". The raised portions 38' are parallel and considerably elongated, and define between themselves the lower portions 38". Both the raised portions 38' and the lower portions 38" are treated so as to be reflective. The raised portions 38' are spaced above the lower portions 38" by a distance equal to one quarter-wave length of some component of the light emitted by lamp 30. Thus, since the small dimensions of raised portions 38', and the distances therebetween, are sufficiently small to produce diffraction by reflection, it follows that the scale 38 will produce a diffraction pattern in its reflected light. Due to the half-wave phase difference between the light reflected from raised portions 38' and lower portions 38", no central, or zero order, beam of light is reflected from grating scale 38. However, there are produced at scale 38 parallel beams of light which are diffracted due to the effect of the grating surface of scale 38, and thus are inclined with respect to the above-mentioned plane. These inclined light beams pass backwards through optical components 37, 36, and 35. In so doing they are again split into mutually displaced component beams by the action of birefringent plate 36, which also plane polarizes the newly split components in planes which are rotated by 90° with respect to the first passage. These returning light beams, being convergent, produce on the surface of hemispherical mirror segment 33 a plurality of parallel images of slot 61, each image corresponding to an order of diffraction.

If the width of the raised portions 38' is equal to the width of the lower portions 38", only those images of slot 61 will appear on the surface of mirror segment 33 which correspond to the odd diffraction orders. If the raised portions 38' and the lower portions 38" of scale 38 deviate from equality, or if the depth of the lower portions 38" below the raised portions 38' is not accurately maintained at one quarter-wave length, these inaccuracies can be compensated for by treating the areas of mirror 33 at the places where the images corresponding to even diffraction orders impinge to prevent reflection.

The images of slot 61 corresponding to odd diffraction orders which are formed on mirror 33 act as light sources, the rays issuing therefrom being reflected and diffracted at scale 38. This light, after its second reflection from scale 38, travels through the half surface of lens 35 which was not utilized the first time. Also, immediately after reflection from scale 38, this light is again split into mutually displaced components by birefringent plate 36. After the second reflection on scale 38, the light beam corresponding to the zero diffraction order passes out through slot 61, in symmetry with the impinging light. This light then passes through a deviating prism 40, and field lens 41. By means of polarized beam splitter 42, the components of this light beam which are polarized in different planes are separated from one another and applied via lenses 43 and 44 to two photoelectric transducers 45 and 46. The light passing upward through lens 35 after the second reflection from scale 38 which corresponds to the higher diffraction orders is directed, by means of the mirrors 60 surrounding slot 61, to two photoelectric transducers 53 and 54, passing first through a field lens 49, a polarizing beam splitter 50 and field lenses 51 and 52. The output signals of photoelectric transducers 53 and 54 correspond to the light returned from the surface of scale 38 by higher order diffraction, and are phase-shifted with respect to each other by the action of birefringent plate 36, as well as the grating constant.

If a cross grating is employed as the grating scale because it is desired to measure in two coordinate directions, then the birefringent component is inserted in the arrangement in such a manner that the splitting direction thereof corresponds to the direction of the angle bisector of the optical elements of the grating. Moreover, care must be taken to see that the light distribution in the focal surface of the diffractive component has two partial surfaces corresponding to the coordinate directions of the grating division and being limited with respect to the breadth thereof. The main illuminating direction correspond to these two partial surfaces. In order to ensure a separation of these directions after passage through the imaging system, appropriate optical means are provided. Here, it is possible, for example, to select differing frequencies of the illumination intensity or the light frequency.

Figure 3:
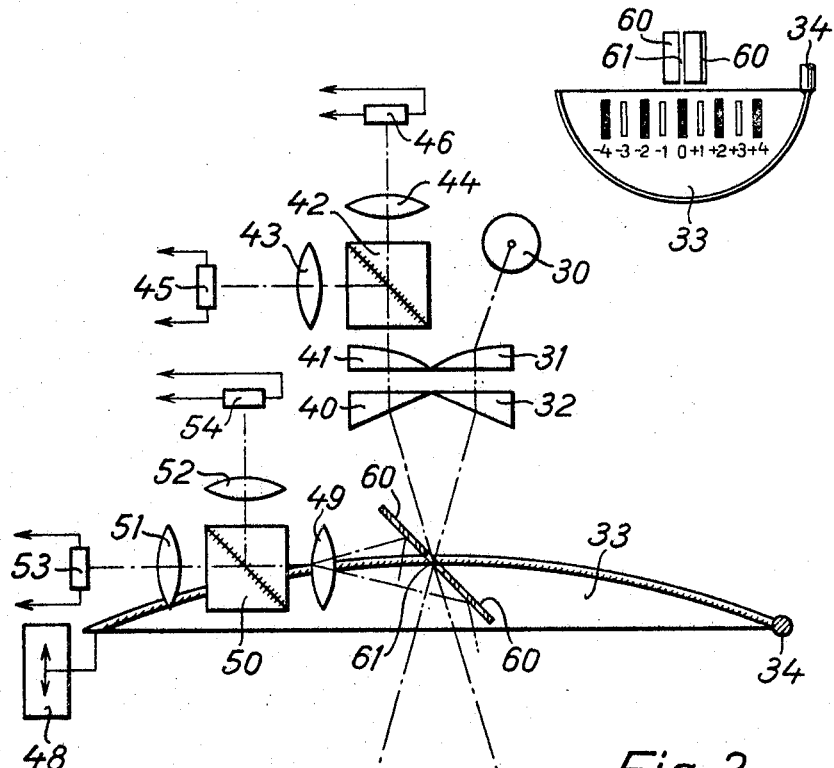
FIGURE 3 is a partial bottom view of FIGURE 2.

FIGURE 3 is a bottom view of reflective hemispherical segment 33. This segment consists of a reflective, halved spherical shell which is mirrored on its inside surface. After the first reflection from grating scale 38 the images of slot 61 corresponding to the various diffraction orders which are not suppressed by the nature of grating scale 38 appear. The parts of the mirror on which the images of slot 61 corresponding to even-numbered diffraction orders appear are treated to prevent reflection. The part of the inner surface of the segment which is treated for reflection may, of course, be less than the whole internal surface of the segment. For measurement in two coordinates, for example, the hemispherical segmental mirror arrangement must be such as to provide reflective surface in three quadrants. Also, in arrangements for measuring in two coordinate directions the entrance-exit slot 61 between the plane mirrors 60 will be of a cross-shaped or angular configuration.

In all of the described embodiments, it is necessary in order to provide maximum geometric separation between optical output signals that the width of entrance-exit slot 61 be no larger than the distance determined by the deviation angle between the corresponding diffraction order components, which is determined by the grating constant. Therefore, the most finely ruled gratings must be provided in order to achieve the highest sensitivities.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. A photoelectric position sensing device, comprising:
   light producing means;
   light ray directing means for forming the rays of light from said light ray producing means into a beam;
   diffracting means for diffracting said beam of light and then rediffracting said beam of light,
      said diffracting means including movable grating means adapted for relative motion with respect to said beam of light;
   first photoelectric transducer means positioned to receive a part of the light of said beam after rediffraction;
   second photoelectric transducer means positioned to receive another part of the light of said beam after rediffraction;
   and separating means for substantially limiting the light impingent upon said first photoelectric transducer means to that corresponding to one diffraction order, and for substantially limiting the light impingent upon said second photoelectric transducer means to that corresponding to other diffraction orders,
      the variations of the light impingent upon said first photoelectric transducer means caused by relative motion of said movable grating means being out of phase with respect to the variations of the light impingent upon said second photoelectric transducer means caused by the relative motion of said movable grating means.

2. A photoelectric position sensing device as claimed in claim 1, including:
   modulating means in the path of said beam of light for dividing said beam of light into separate beams having distinguishing properties;
   plural photosensitive elements in each of said photoelectric transducer means;
   and classifying means in each of said photoelectric transducer means for directing each of said separate beams of light onto a corresponding one of said photosensitive elements in accordance with its distinguishing property.

3. A photoelectric position sensing device as claimed in claim 2 in which said modulating means includes birefringent polarizing means and said classifying means include polarization analyzing means.

4. A photoelectric position sensing device as claimed in claim 1 in which said separating means comprises a mirror having aperture means, said aperture means being as narrow as permitted by the grating constant of said movable grating means.

5. A photoelectric position sensing device as claimed in claim 1 in which said movable grating means comprises a phase grating.

6. A photoelectric position sensing device as claimed in claim 5 in which said phase grating has an effective difference in path of travel of one-half wavelength for a component of the light produced by said light producing means.

7. A photoelectric position sensing device as claimed in claim 1 in which said movable grating means comprises an amplitude grating.

8. A photoelectric position sensing device as claimed in claim 1 in which said movable grating means comprises a phase-amplitude grating.

9. A photoelectric position sensing device as claimed in claim 1 in which said diffracting means includes a second grating means.

10. A photoelectric position sensing device as claimed in claim 9, including:
    modulating means in the path of said beam of light for dividing said beam of light into separate beams having distinguishing properties;
    plural photosensitive elements in each of said photoelectric transducer means;
    and classifying means in each of said photoelectric transducer means for directing each of said separate beams of light onto a corresponding one of said photosensitive elements in accordance with its distinguishing property.

11. A photoelectric position sensing device as claimed in claim 9 in which said modulating means includes birefringent polarizing means and said classifying means include polarization analyzing means.

12. A photoelectric position sensing device as claimed in claim 9 in which said separating means comprises a mirror having aperture means, said aperture means being as narrow as permitted by the grating constant of said movable grating means.

13. A photoelectric position sensing device as claimed in claim 9 in which said movable grating means comprises a phase grating.

14. A photoelectric position sensing device as claimed in claim 13 in which said phase grating has an effective difference in path of travel of one-half wavelength for a component of the light produced by said light producing means.

15. A photoelectric position sensing device as claimed in claim 9 in which said movable grating means comprises an amplitude grating.

16. A photoelectric position sensing device as claimed in claim 9 in which said movable grating means comprises a phase-amplitude grating.

17. A photoelectric position sensing device as claimed in claim 1 in which the only grating means in said diffracting means is said movable grating means, and said beam of light is redirected onto said movable grating means for rediffraction.

18. A photoelectric position sensing device as claimed in claim 17, including:
  modulating means in the path of said beam of light for dividing said beam of light into separate beams having distinguishing properties;
  plural photosensitive elements in each of said photoelectric transducer means;
  and classifying means in each of said photoelectric transducer means for directing each of said separate beams of light onto a corresponding one of said photosensitive elements in accordance with its distinguishing property.

19. A photoelectric position sensing device as claimed in claim 18 in which said modulating means includes birefringent polarizing means and said classifying means include polarization analyzing means.

20. A photoelectric position sensing device as claimed in claim 17 in which said separating means comprises a mirror having aperture means, said aperture means being as narrow as permitted by the grating constant of said movable grating means.

21. A photoelectric position sensing device as claimed in claim 17 in which said movable grating means comprises a phase grating.

22. A photoelectric position sensing device as claimed in claim 21 in which said phase grating has an effective difference in path of travel of one-half wavelength for a component of the light produced by said light producing means.

23. A photoelectric position sensing device as claimed in claim 17 in which said movable grating means comprises an amplitude grating.

24. A photoelectric position sensing device as claimed in claim 17 in which said movable grating means comprises a phase-amplitude grating.

25. A photoelectric position sensing device as claimed in claim 1, including at least a grating with crossed markings having a crossing angle corresponding with the angle of the two coordinates of the measurement.

References Cited

UNITED STATES PATENTS

| | | | |
|---|---|---|---|
| 2,849,912 | 9/1958 | Plesse et al. | 250—220 X |
| 2,986,066 | 5/1961 | Rouy | 356—116 |
| 2,998,746 | 9/1961 | Gievers | 250—225 X |
| 3,098,186 | 7/1963 | Williamson et al. | 250—237 X |
| 3,198,061 | 8/1965 | Hock | 356—169 |
| 3,421,011 | 1/1969 | Hock | 250—237 X |

FOREIGN PATENTS 991,710   5/1965   Great Britain.

JAMES W. LAWRENCE, Primary Examiner

V. LAFRANCHI, Assistant Examiner

U.S. Cl. X.R.

250—225, 220, 210, 230; 350—152; 356—169, 114